US008761016B2

(12) United States Patent
Bing (10) Patent No.: US 8,761,016 B2
(45) Date of Patent: Jun. 24, 2014

(54) SYSTEMS AND METHODS FOR INTELLIGENT POLICY ENFORCEMENT IN ACCESS NETWORKS (75) Inventor: Benny K. Bing, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 257 days.

(21) Appl. No.: 12/412,717

(22) Filed: Mar. 27, 2009

(65) Prior Publication Data
US 2009/0245130 A1 Oct. 1, 2009

Related U.S. Application Data (60) Provisional application No. 61/040,333, filed on Mar. 28, 2008.

(51) Int. Cl.
H04L 12/26 (2006.01)
(52) U.S. Cl.
USPC ............ 370/235; 370/229; 370/252; 375/225
(58) Field of Classification Search
USPC .................... 370/229, 235, 252; 375/225
See application file for complete search history.

(56) References Cited

U.S. PATENT DOCUMENTS

| 6,115,356 | A * | 9/2000 | Kalkunte et al. | 370/229 |
|---|---|---|---|---|
| 7,593,339 | B2 * | 9/2009 | Shoemake et al. | 370/235 |
| 7,630,401 | B2 * | 12/2009 | Iwamura | 370/468 |
| 7,630,944 | B2 * | 12/2009 | Rupp et al. | 706/20 |
| 2005/0276219 | A1 * | 12/2005 | Wang et al. | 370/229 |
| 2006/0092845 | A1 * | 5/2006 | Kwan et al. | 370/235 |

OTHER PUBLICATIONS

B. Bing, "Ubiquitous Broadband Access Networks with Peer-to-Peer Application Support", IEC Annual Review of Communications: vol. 59, Nov. 2006.
K. Haddadou, et. al., "Designing Scalable On-Demand Policy-Based Resource Allocation in IP Networks", IEEE Communications Magazine, vol. 44, No. 3, Mar. 2006, pp. 142-149.
E. Miller, F. Andreasen, & G. Russell, "The PacketCable Architecture", IEEE Communications Magazine, vol. 39, No. 6, Jun. 2001, pp. 90-96.
D. Karabudak, C. Hung, & B. Bing "An Intelligent Admission Control Scheme for Next Generation Wireless Systems using Genetic Algorithms", IEEE WCNC 2004, Atlanta, GA, USA, Mar. 21-25, 2004.
B. Bing, "Intelligent Resource Management and Implementation for Broadband Cable Networks", 5th IEEE Consumer Communications and Networking Jan. 10-12, 2008, pp. 1139-1143.
B. Bing, "Intelligent Policy Resource Management for Advanced Broadband Access Networks", Canadian Conference on Electrical and Computer Engineering, Apr. 22-26, 2007, pp. 227-230.

* cited by examiner

Primary Examiner — Charles C Jiang
Assistant Examiner — Siming Liu
(74) Attorney, Agent, or Firm — Thomas | Horstemeyer, LLP (57) ABSTRACT Systems and methods of intelligent policy enforcement in access networks are disclosed. One such method is implemented in a network device and comprises updating a traffic history with information associated with an incoming packet arriving from or destined to a subscriber link. The method also comprises calculating a drop probability for a next traffic instant and predicting a traffic rate for each of a plurality of flows on the subscriber link. The method also comprises determining whether the incoming packet conforms to a traffic policy associated with the incoming packet. The method also comprises determining whether surplus bandwidth is available on the subscriber link. The method also comprises forwarding the packet responsive to the determination that the incoming packet does not conform and that surplus bandwidth is available.

19 Claims, 6 Drawing Sheets

SYSTEMS AND METHODS FOR INTELLIGENT POLICY ENFORCEMENT IN ACCESS NETWORKS

CROSS REFERENCE TO RELATED APPLICATIONS

This application claims priority to copending U.S. Provisional Application having Ser. No. 61/040,333 filed Mar. 28, 2008, which is hereby incorporated by reference in its entirety.

BACKGROUND

A growing number of consumers now have high speed, or broadband, connections to the Internet in their homes. The increased bandwidth provided by these broadband connections allows the delivery of media services, such as telephone, digital television, and/or video, to various devices located in the home or office. Typically, subscribers of a service provider have a service level agreement (SLA) which guarantees a particular level of service, or quality of service (QoS), for a fee. In conventional systems, a service provider may drop and/or delay packets destined for, or originating from, one subscriber in order to meet another subscriber's SLA.

TECHNICAL FIELD

This application relates generally to data communications and networking, and more specifically, to enforcing quality of service policies in an access network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
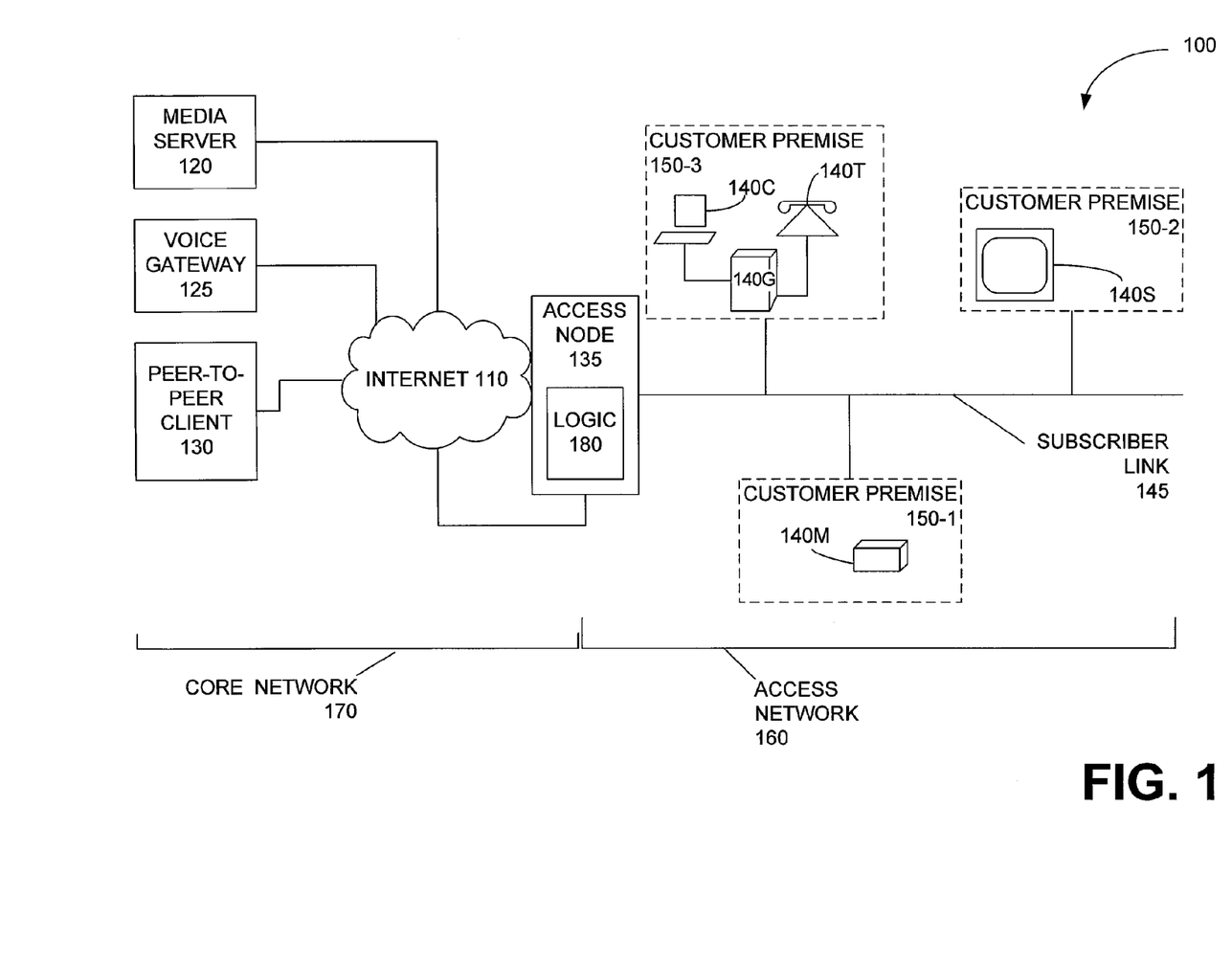
FIG. 1 is a block diagram of a network which implements intelligent policy enforcement, in accordance with some embodiments disclosed herein.

FIG. 1 is a block diagram of a network which implements intelligent policy enforcement in access networks. System 100 allows subscribers to receive various digital services over Internet 110, for example video and/or audio content provided by a media server 120, voice (telephony) services provided by a voice gateway 125 and file sharing provided by a peer to peer client 130. Examples of other services (not shown) include remote gaming, video conferencing, Internet video streaming, web services/applications, web content, etc.

Subscribers gain access to Internet 110 and to these services through a broadband access node 135, which is communicatively coupled to various subscriber endpoints 140 through subscriber link 145. In this example, the endpoints are a multimedia terminal adapter 140M at customer premises 150-1, a set-top box 140S at customer premises 150-2, and a residential gateway 140G at customer premises 150-3. In this example, the gateway endpoint 140G at customer premises 150-3 connects a computer 140C and a telephone 140T to subscriber link 145, but other mechanisms for connecting multiple subscriber devices to subscriber link 145 are also supported, including wireless access methods such as WiMax or Long Term Evolution (LTE).

A one-to-many arrangement exists between one broadband access node 135 and multiple customer premise endpoints (e.g., residential gateways, integrated access devices, multimedia terminal adapters, cable modems, DSL modems. etc.). In this example, a single broadband subscriber link 145 is shared by multiple customer premises. A hybrid fiber coax (HFC) link supplied by a cable television provider is one example of such a shared medium, in which case broadband access node 135 may implement the Data Over Cable Service Interface Specification (DOCSIS) and be referred to as a "cable modem termination system" (CMTS). Another example of a shared medium is a wireless link, in which case broadband access node 135 may take the form of a wireless base station. In other embodiments, each customer premise has a separate broadband subscriber link 145. A digital subscriber loop (DSL) link supplied by a telephone company is one example of such a non-shared medium, in which case broadband access node 135 may be implemented as a DSL access multiplexer (DSLAM).

The subscriber side of system 100, shown in FIG. 1 as access network 160, is sometimes referred to as "the last mile". The remaining portion of system 100 is sometimes referred to as a core network 170. The location where broadband access node 135 resides is sometimes referred to as the "head end" or "central office", and these terms are sometimes also used to refer to the collection of network equipment at that location.

Broadband access node 135 (possibly working in conjunction with other network devices) acts as a gatekeeper to Internet 110 by authenticating and authorizing specific users and/or devices. In addition, broadband access node 135 (possibly working in conjunction with other network devices) ensures that subscribers get the quality or level of service they contracted for (e.g., in terms of bandwidth, delay, dropped packets, etc.), which typically involves dropping and/or delaying packets which travel over subscriber link 145, under some conditions. Conventional broadband access nodes apply specific criteria ("policies") to packets traveling over subscriber link 145 and drop those which do not meet these criteria. Broadband access node 135 includes intelligent policy enforcement logic 180 (discussed in more detail below) which allows these packets—which would otherwise be dropped—to be delivered when and if surplus bandwidth exists. However, before discussing the techniques used by intelligent policy enforcement logic 180, a Quality of Service (QoS) model utilized by some embodiments of broadband access node 135 will now be discussed in connection with FIG. 2.

Figure 2:
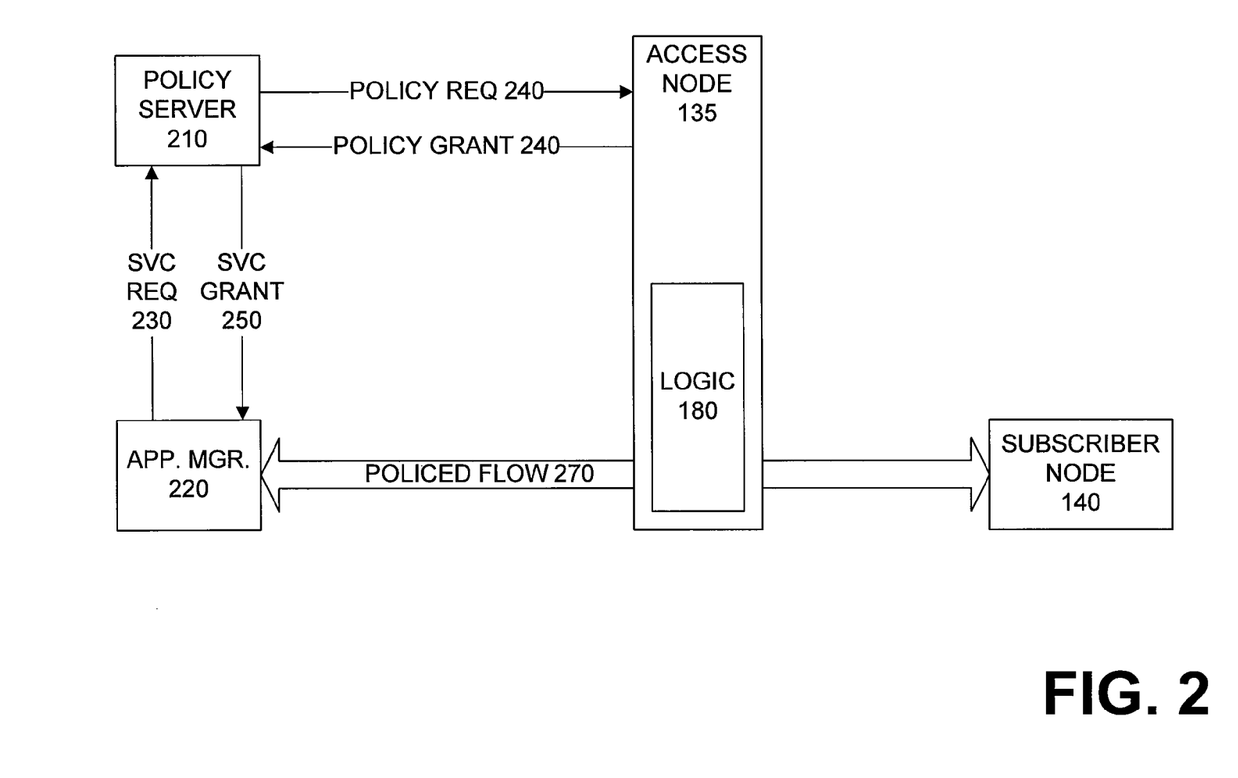
FIG. 2 is a block diagram of selected components of the access network from FIG. 1, in accordance with some embodiments disclosed herein.

FIG. 2 is a block diagram of selected components of access network 160 including broadband access node 135 from FIG. 1. As mentioned above, broadband access node 135 implements quality of service (QoS) on subscriber link 145, in cooperation with several other components (typically also located at the head end). The QoS model and the components discussed in connection with FIG. 2 are that used by the PacketCable Multimedia (PCMM) standard, but a person of ordinary skill in the art should appreciate that the techniques disclosed herein for intelligent policy enforcement in access networks also apply to other QoS models having a different distribution of functionality among components.

Broadband access node 135 is provided with criteria or policies that control the QoS for a packet or for a packet flow. These policies can be viewed as requirements or rules for resource allocation, such that providing a policy to broadband access node 135 instructs broadband access node 135 to allocate the resources (e.g., buffers in broadband access node 135, frequencies, timeslots and/or bandwidth on subscriber link 145) that are necessary to deliver the QoS described by the policy. In the PacketCable framework illustrated in FIG. 2, broadband access node 135 receives policies from a policy server 210. Example policy parameters include (but are not limited to): traffic priority; maximum sustained traffic rate; maximum traffic burst; minimum reserved traffic rate; and minimum reserved rate packet size.

In some embodiments, the Common Open Policy Service Protocol (COPS) is used to exchange policy information between broadband access node 135 (acting as a policy enforcement point or PEP) and policy server 210 (acting as a policy decision point or PDP). However, other mechanisms for providing policy information to broadband access node 135 are also contemplated, including an embodiment in which no policy server is used and policies are instead input into broadband access node 135 by a network administrator.

In the PacketCable framework illustrated in FIG. 2, policy server 210 reacts to service requests from one or more application managers 220. That is, policy server 210 converts service requests from an application manager 220 into policies, which are then used to set up resources at broadband access node 135 to deliver a particular QoS to a subscriber node 140. In some embodiments, the conversion makes use of policy statements input by a network administrator describing the relative priority of various traffic types (e.g., voice, bulk data, video, teleconferencing, etc.) for a subscriber, limits on the types of QoS available to a subscriber, limits on which applications a policy server will accepts, and limits on the impact of service on a particular broadband access node 135.

In the PacketCable framework illustrated in FIG. 2, application manager 220 receives application-specific requests on behalf of a subscriber node 140. In the example of FIG. 2, application manager 220 is a web server which receives HTML requests directly from a streaming media client application on subscriber node 140. (The PacketCable QoS model also allows for an application server which acts as an intermediary between a client application and application manager 220, but this intermediary is not discussed here.) After application manager 220 determines whether subscriber node 140 is authorized to receive the media stream, it determines the QoS resources required and sends this information to policy server 210. Thus, application manager 220 reserves and commits resources on behalf of client applications.

Once a policy request has been granted by broadband access node 135, and the corresponding service request has been communicated back to application manager 220, the client can receive the requested service from application manager 220, and broadband access node 135 will enforce QoS on the packet flow providing the service.

The process described above is illustrated in FIG. 2 as follows. Application manager 220 originates a service request (230) on behalf of subscriber node 140, which in turn is transformed into a policy request (240) from policy server 210 to broadband access node 135. Broadband access node 135 grants (250) the policy request to policy server 210, which communicates service grant (260) back to application manager 220. The resulting policed packet flow 270 between application manager 220 and subscriber node 140 traverses broadband access node 135, which polices the flow by applying the policy associated with the flow, thus ensuring that the data rate for the flow 270 is within the bounds set by the contract with the subscriber in the Service Level Agreement (SLA).

Figure 3:
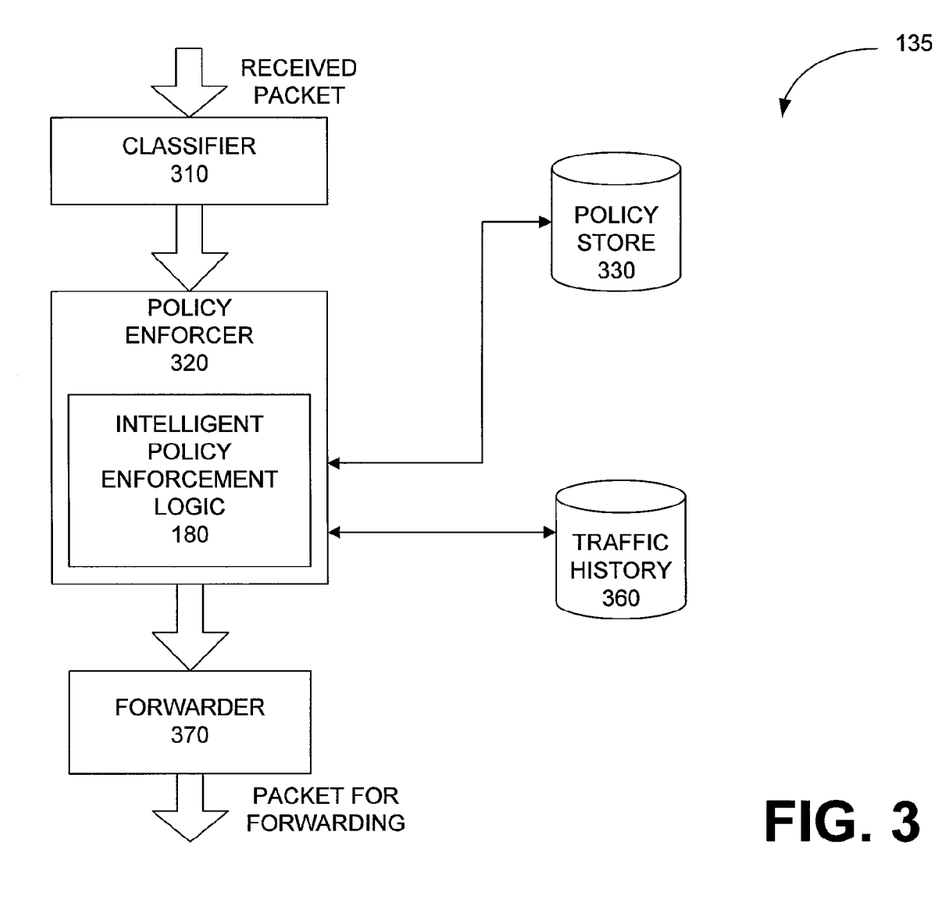
FIG. 3 is a block diagram of an example embodiment of the broadband access node from FIG. 1.

FIG. 3 is a block diagram of an example embodiment of selected components within broadband access node 135, including intelligent policy enforcement logic 180. Packet flow through broadband access node 135 can be bidirectional. Packets flowing "upstream" are received from a subscriber endpoint 140 and are destined for the core network 170 or for the head-end itself. Packets flowing "downstream" are received from the core network (or the head-end itself) and are destined for subscriber endpoint 140.

Packet flow through broadband access node 135 will be described below, but generally incoming packets are classified, a policy is applied and a decision to forward or drop is made, where forwarding results in re-transmission of the packet in its original direction (e.g., a packet flowing downstream is transmitted on a downstream interface). Packets are received at broadband access node 135 through a network interface of some kind, such as a local area network (LAN) interface, a wide area network (WAN) interface, or an RF (radio frequency) interface. In some cable modem termination system (CMTS) embodiments, a single interface couples the CMTS to the core network, but two different interfaces couple the CMTS to subscriber link 145: packets are received from subscriber link 145 through an upstream RF modulator, while packets are transmitted to subscriber link through a downstream modulator.

After being received, incoming packets are classified by packet classifier 310 using one or more header fields (e.g., Ethernet address, IP address, IP port, IP protocol type, etc.). In some embodiments, each packet is classified into an n-tuple flow comprising IP source and destination address, IP source and destination port, IP protocol type and possibly higher-layer information such as socket, stream identifier, etc. Flow and packet classification techniques should be understood by a person of ordinary skill in the art, and will not be discussed further.

After classification, the packet and a class identifier are provided to a policy enforcer 320, which uses the class identifier to look up in policy store 330 the appropriate policy to be applied. Policy enforcer 320 applies this policy which determines whether the packet is dropped (path 340) or forwarded to its intended destination (path 350). More specifically, intelligent policy enforcement logic 180 associated with policy enforcer 320 uses the techniques described below in connection with FIG. 4 to update traffic history 360 and then uses traffic history 360 in combination with the retrieved policy to make the drop/forward decision. If the decision indicates forwarding, a forwarder 370 then forwards the packet appropriately, which may involve changing headers and other modification of the packet, as should be familiar to a person of ordinary skill in the art.

In the example shown in FIG. 3, logic 180 is shown as residing within policy enforcer 320, but this is simply a logical distinction made to illustrate that intelligent policy enforcement can be considered a part of the overall enforcement functionality. A person of ordinary skill in the art should appreciate that the two functions may be integrated or may be separate, depending on design and implementation considerations.

Figure 4:
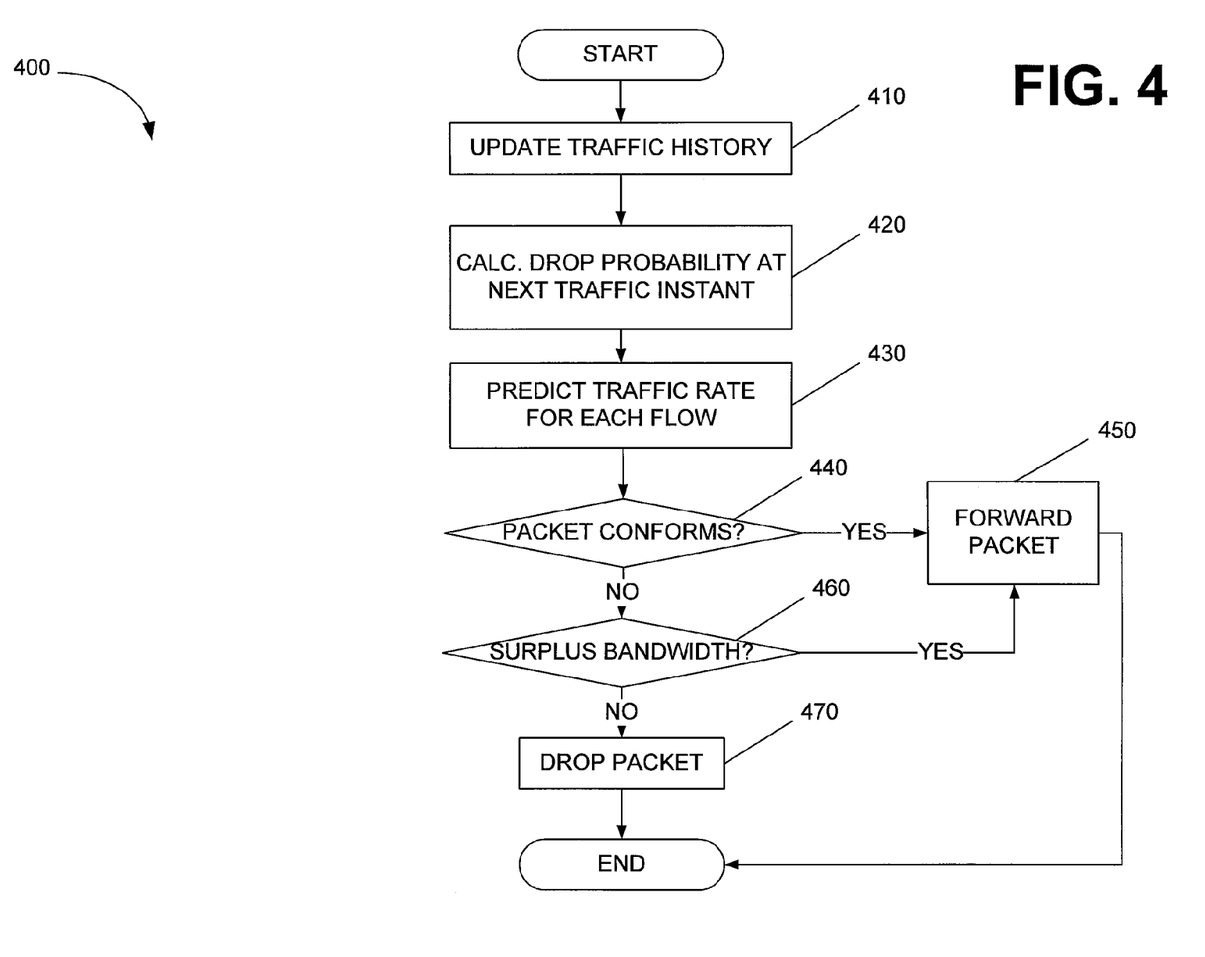
FIG. 4 is a flow chart of a method performed by intelligent policy enforcement logic from FIG. 1, in accordance with some embodiments disclosed herein.

FIG. 4 is a flow chart of a method performed by intelligent policy enforcement logic 180 in accordance with some embodiments disclosed herein. Process 400 is performed upon receiving a packet (described earlier in connection with FIG. 2). Process 400 begins at block 410, where traffic history 360 is updated to reflect the receipt of the packet. Traffic history 360 stores information associated with the incoming packet, for example, packet size, arrival time, buffer utilization within broadband access node 135 and within policy enforcer 320, overall bandwidth utilization (upstream and downstream) on subscriber link 145. In some embodiments, the window stored by traffic history 360 is on the order of one second.

Processing continues at block 420, where the probability of traffic rate (e.g., drop probability) in the next traffic instant or transmit opportunity is calculated. Some embodiments account for three different transmission scenarios: single packet transmission (e.g., control packet transmission), multiple packet transmission (e.g., Web download), and packet streaming (e.g., voice and video streaming). Some typical computation methods for each of these scenarios as follows. In a single packet transmission, if the cable channel causes independent errors from packet to packet and the error probability is constant for all packets of same length, then the probability of dropped packet after n retransmissions is $p_{drop}=(p_e)^{n-1}$ where $p_e$ is packet error probability in a single transmission attempt. If $p_{e=0.1}$ and $p_{drop}=10^{-8}$, then n=7. In other words, the scheduler has to accommodate 7 transmit opportunities. In a multiple packet transmission scenario, suppose N packets need to be transmitted correctly and the packet error probabilities are Bernoulli distributed. Then it can be shown that:

$$p_{drop} = \sum_{k=N_{ex}}^{N+N_{ex}} \binom{N+N_{ex}}{k}(p_e)^{N_{ex}}(1-p_e)^{N+N_{ex}-k} = B_{p_e}(N_{ex}, N+1)$$

where B( ) is the Incomplete Beta Function, assuming N is large. If N=100, $p_e$=0.1, $p_{drop}$=$10^{-8}$, then $N_{ex}$=38. The surplus bandwidth allowance, S=$N_{allocated}$/$N_{payload}$=(N+$N_{ex}$)/N=1.38. If N=100,000, $p_e$=0.1, $p_{drop}$=$10^{-8}$, then $N_{ex}$~12,000, S~1.12. The surplus bandwidth decreases as N increases. For an infinite packet stream with no delay constraints, S approaches the lower bound of 1.111.

At block 430, the traffic rate for each flow on subscriber link 145 is predicted, which provides both volume and time limits to the bandwidth allocation. At block 440, process 400 determines whether the packet conforms to the traffic policy associated with the flow, based at least in part on traffic history 360. If the result indicates that the received packet does conform to the policy, a decision is made to forward the packet (block 450), and process 400 is finished. In some embodiments, a hard threshold is used (e.g., subscriber flow is allowed to exceed the policy's maximum rate K times per hour).

However, if the result at block 440 indicates that the received packet does not conform to the policy, process 400 makes an additional check at block 460 to determine if surplus bandwidth is available on the flow. Surplus bandwidth can be defined in various ways, for example: the difference between the maximum bitrate of subscriber link 145 and bitrate actually in use at an observation time; or the difference between the maximum bitrate of subscriber link 145 and the subscribed (e.g., paid-for) bitrate at an observation time. In some contexts (e.g., 802.11 wireless local area networks) surplus bandwidth may also be described in terms of a surplus bandwidth allowance, which is excess allocation of time over and above the stated application rates required to transport a frame belonging to a particular stream, taking retransmissions into account.

If block 460 determines that surplus bandwidth is not available, a decision is made to drop the packet (block 470) and process 400 is finished. If surplus bandwidth is available, a decision is made to forward the packet (block 450), and process 400 is finished. Thus, intelligent policy enforcement logic 180 drops the packet only if the packet does not conform to the policy and surplus bandwidth is not available. This behavior is different than conventional techniques for policy enforcement at a broadband access node, which drops all non-conforming packets even when surplus bandwidth is available.

Figure 5:
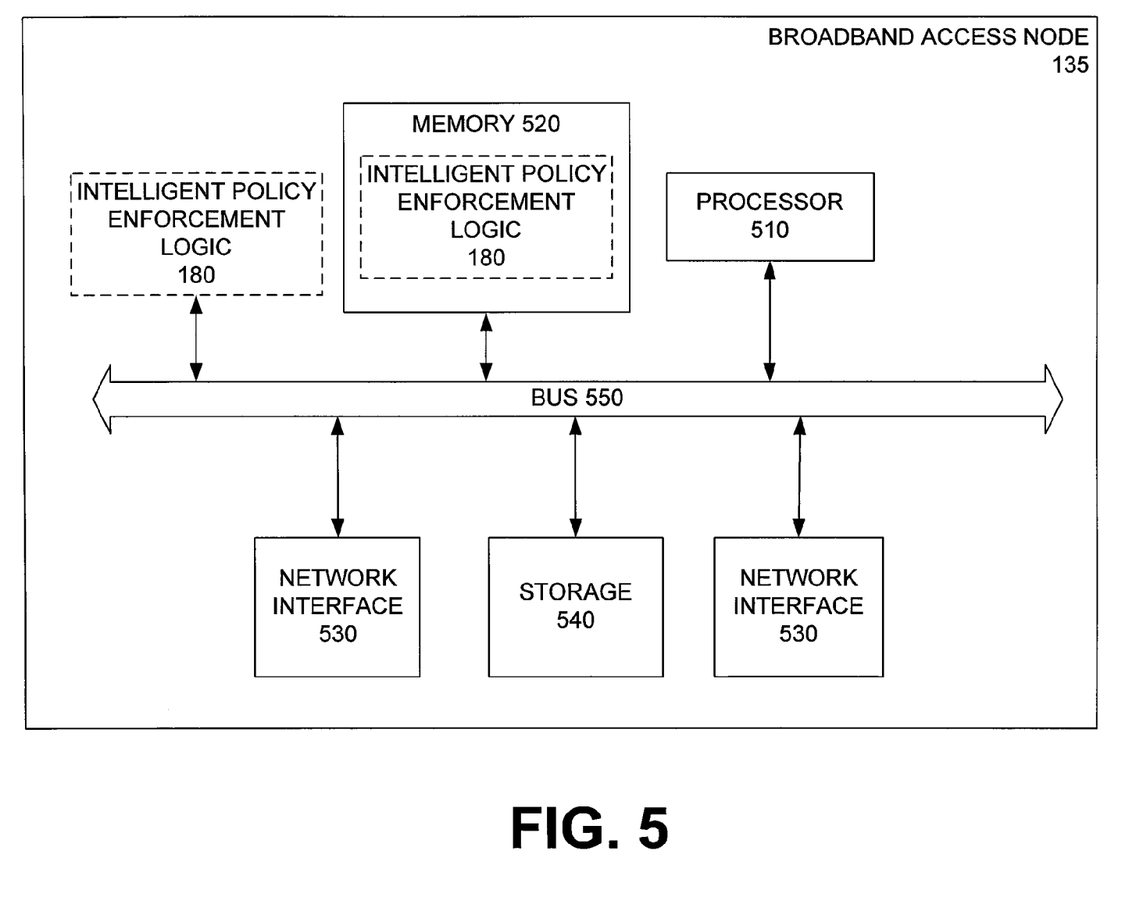
FIG. 5 is a block diagram of the access node 135 from FIG. 1, according to some embodiments disclosed herein.

FIG. 5 is a block diagram of a broadband access node 135, according to some embodiments disclosed herein. Broadband access node 135 includes processor 510, memory 520, network interfaces 530, and storage device 540 (e.g., non-volatile memory or a disk drive). These components are coupled via a bus 550. As indicated by the blocks with dashed lines, the intelligent policy enforcement logic 180 may be implemented in dedicated hardware logic, or in software (i.e., instructions executing on a processor). Omitted from FIG. 5 are a number of components that are unnecessary to explain the operation of intelligent policy enforcement logic 180.

Figure 6:
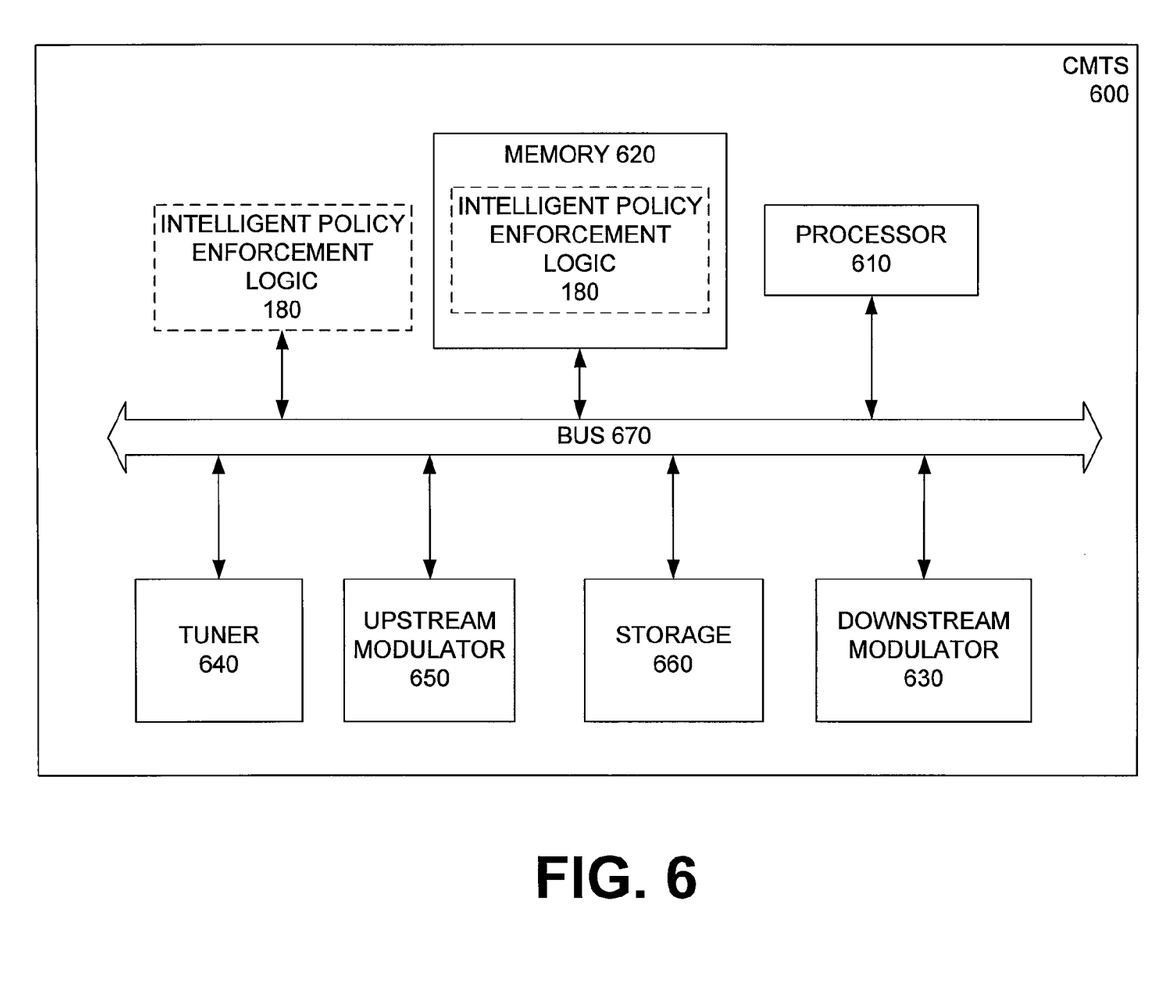
FIG. 6 is a block diagram of a cable modem termination system (CMTS) which implements access node 135 from FIG. 1, according to some embodiments disclosed herein.

FIG. 6 is a block diagram of a cable modem termination system (CMTS) which implements intelligent policy enforcement logic 180, according to some embodiments disclosed herein. CMTS 600 includes processor 610, memory 620, downstream modulator 630, tuner 640, upstream modulator 650, and storage device 660 (e.g., non-volatile memory or a disk drive). These components are coupled via a bus 670. As indicated by the blocks with dashed lines, the intelligent policy enforcement logic 180 may be implemented in dedicated hardware logic, or in software (i.e., instructions executing on a processor). Omitted from FIG. 6 are a number of components that are unnecessary to explain the operation of intelligent policy enforcement logic 180.

The various modules described herein (e.g., packet classifier 310, policy enforcer 320, intelligent policy enforcement logic 180) may be implemented in dedicated hardware logic, or in software (i.e., instructions executing on a processor). Dedicated hardware embodiments include, but are not limited to, a programmable logic device (PLD), a field programmable gate array (FPGA), an application-specific integrated circuit (ASIC), a system on chip (SoC), and a system in package (SiP). Furthermore, intelligent policy enforcement logic 180 may be implemented as a combination of dedicated hardware logic and processor-executable instructions.

When implemented as software, the modules described herein can be embodied in any computer-readable medium for use by or in connection with any processor which fetches and executes instructions. In the context of this disclosure, a "computer-readable medium" can be any means that can contain or store the program for use by, or in connection with, the processor. The computer readable medium can be based on electronic, magnetic, optical, electromagnetic, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The components and modules illustrated herein are abstractions chosen to illustrate how functionality is partitioned in some embodiments disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods for handling access violations are described herein in terms of code and data, rather than with reference to a particular hardware device executing that code. Furthermore, the systems and methods can be implemented in any programming language, and executed on any hardware platform.

The flow charts herein provide examples of the operation of various software components, according to embodiments disclosed herein. Alternatively, these diagrams may be viewed as depicting actions of an example of a method implemented by such software components. Blocks in these diagrams represent procedures, functions, modules, or portions of code which include one or more executable instructions for implementing logical functions or steps in the process. Alternate embodiments are also included within the scope of the disclosure. In these alternate embodiments, functions may be executed out of order from that shown or discussed, including substantially concurrently or in reverse order, depending on the functionality involved. Not all steps are required in all embodiments.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and describe in order to best explain the principles of the invention and its practical applications, to thereby enable others skilled in the art to best utilize the invention and various embodiments with various modifications as are suited to the particular use contemplated.

What is claimed is:

1. A method implemented in a broadband access node, the method comprising:
    updating a traffic history with information associated with a data packet, the data packet arriving at the broadband access node and originating from one of a subscriber link or a digital media traffic source;
    calculating a drop probability for a next traffic instant associated with the data packet;
    predicting a traffic rate for each data packet flow of a plurality of data packet flows on the subscriber link;
    determining whether the data packet conforms to a traffic policy associated with the data packet;
    in response to determining that the data packet conforms to the traffic policy, forwarding the data packet; and
    in response to determining that the data packet does not conform to the traffic policy:
        determining whether surplus bandwidth is available on the subscriber link based at least in part on an allocation of excess transmission time by a resource scheduler and the drop probability; and
        forwarding the data packet, in response to the determination that the surplus bandwidth is available.

2. The method of claim 1, wherein updating the traffic history comprises:
    updating the traffic history with at least one of a size of the data packet, buffer utilization within the broadband access node, or a bandwidth utilization on the subscriber link.

3. The method of claim 1, wherein calculating the drop probability accounts for at least one of single data packet transmission, multiple data packet transmission, or data packet streaming.

4. The method of claim 1, wherein the traffic policy describes at least one of traffic priority, maximum sustained traffic rate, maximum traffic burst, minimum reserved traffic rate, or minimum reserved rate packet size.

5. The method of claim 1, wherein the traffic policy includes a parameter.

6. The method of claim 5, wherein the parameter corresponds to at least one of a traffic priority, a maximum sustained traffic rate, a maximum traffic burst, a minimum reserved traffic rate, or a minimum reserved rate packet size.

7. The method of claim 1, wherein determining whether the surplus bandwidth is available takes into account a packet error probability and the drop probability.

8. A broadband access node comprising:
    a first network interface;
    a second network interface;
    a memory having instructions stored thereon; and
    a processor configured by the instructions to:
        update a traffic history with information associated with a media packet arriving at the broadband access node from one of a subscriber link or a digital media traffic source;
        calculate a drop probability for a next traffic instant associated with the media packet;
        predict a traffic rate for each media flow of a plurality of media flows on the subscriber link;
        determine whether the media packet conforms to a traffic policy associated with the media packet;
        if the media packet conforms to the traffic policy, forward the media packet on an appropriate one of the first network interface or the second network interface; and
        if the media packet does not conform to the traffic policy:
            determine whether surplus bandwidth is available on the subscriber link based at least in part on an allocation of excess transmission time, a packet error probability, and the drop probability; and
            forward the media packet on an appropriate one of the first network interface or the second network interface, in response to determining that the surplus bandwidth is available.

9. The broadband access node of claim 8, wherein the processor is further configured to:
update the traffic history with a size of the media packet.

10. The broadband access node of claim 8, wherein the processor is further configured to:
update the traffic history with utilization for a buffer within the broadband access node.

11. The broadband access node of claim 8, wherein the processor is further configured to:
update the traffic history with a utilization of bandwidth on the subscriber link.

12. The broadband access node of claim 8, wherein calculating the drop probability accounts for at least one of single media packet transmission, multiple media packet transmission, or media packet streaming.

13. The broadband access node of claim 8, wherein the policy describes at least one of traffic priority, maximum sustained traffic rate, maximum traffic burst, minimum reserved traffic rate, or minimum reserved rate packet size.

14. A cable modem termination system (CMTS) comprising:
a downstream modulator;
memory having instructions stored thereon; and
a processor configured by the instructions to:
update a traffic history with information associated with a media packet received at the CMTS from at least one of a subscriber link or a digital media traffic source;
calculate a drop probability for a next traffic instant associated with the media packet that accounts for at least one of single data packet transmission, multiple data packet transmission, or data packet streaming;
predict a traffic rate for each media flow of a plurality of media flows on the subscriber link;
determine whether the media packet conforms to a traffic policy associated with the media packet;
if the media packet is determined to conform with the traffic policy, forward the media packet on the subscriber link; and
if the media packet is determined to not conform with the traffic policy:
determine whether surplus bandwidth is available on the subscriber link based at least in part upon the drop probability; and
forward the packet on the subscriber link via the downstream modulator, in response to the determination that the surplus bandwidth is available.

15. The CMTS of claim 14, further comprising an upstream modulator, wherein another media packet is received through the upstream modulator and the processor is further configured to:
update the traffic history with information associated with the another media packet; and
determine whether the another media packet conforms to the traffic policy associated with the another media packet; and
in response to the determination that the another media packet does not conform and that surplus bandwidth is available, forward the another media packet on an appropriate network interface.

16. The CMTS of claim 14, wherein the processor is further configured to:
update the traffic history with a size of the media packet.

17. The CMTS of claim 14, wherein the processor is further configured to:
update the traffic history with utilization for a buffer within the CMTS.

18. The CMTS of claim 14, wherein the processor is further configured to:
update the traffic history with a utilization of bandwidth on the subscriber link.

19. The CMTS of claim 14, wherein the policy describes at least one of traffic priority, maximum sustained traffic rate, maximum traffic burst, minimum reserved traffic rate, or minimum reserved rate packet size.

* * * * *